May 17, 1932.   F. T. SNYDER   1,858,972
PROCESS FOR EVAPORATIVE CARBONIZATION OF ORGANIC MATERIALS
Filed June 8, 1925
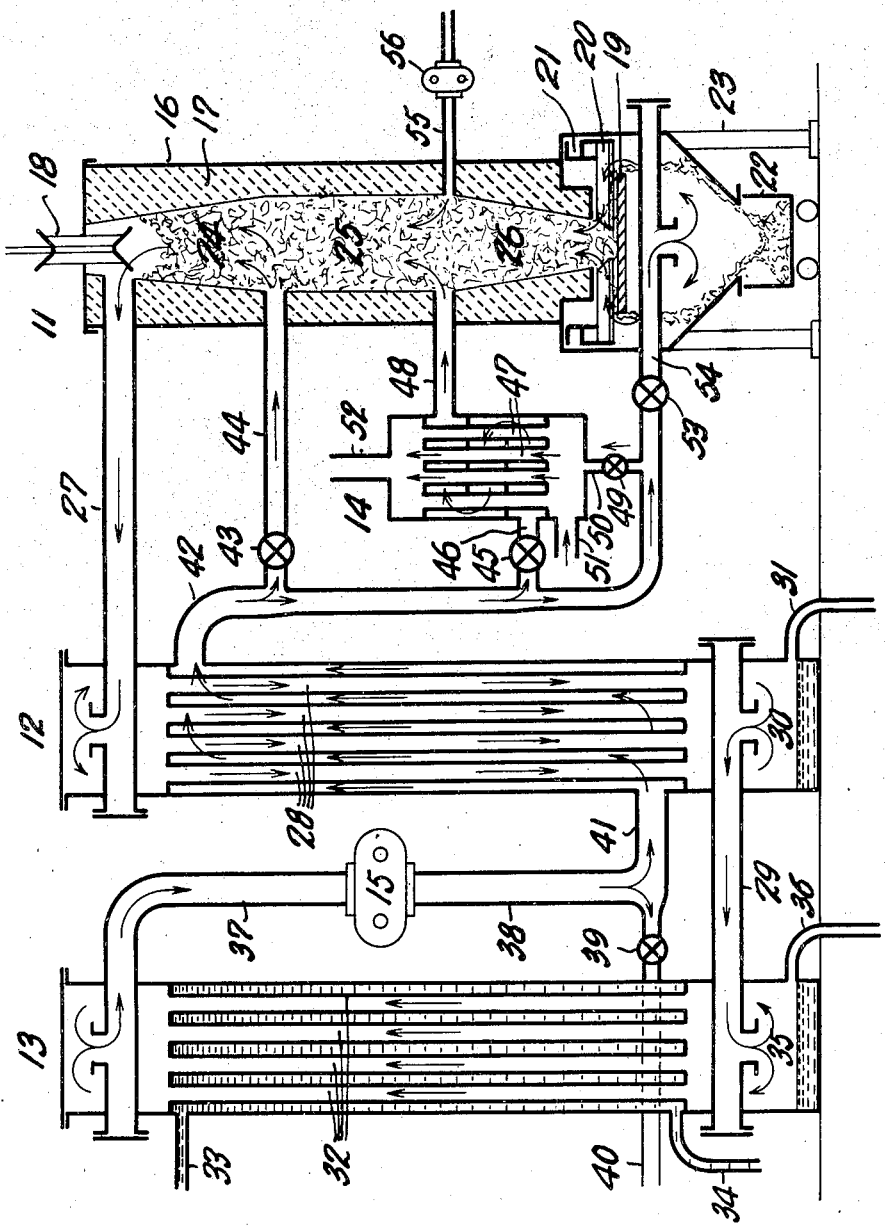
Inventor
Frederick T. Snyder
By
Attorney Patented May 17, 1932

1,858,972

UNITED STATES PATENT OFFICE

FREDERICK T. SNYDER, OF NEW CANAAN, CONNECTICUT

PROCESS FOR EVAPORATIVE CARBONIZATION OF ORGANIC MATERIALS

Application filed June 8, 1925. Serial No. 35,802.

This invention relates broadly to a process of carbonizing organic materials and producing gaseous and solid fuel therefrom, and also relates to apparatus suitable for carrying out the process, and to the solid fuel produced.

More specifically the invention relates to a process of carbonizing organic materials by evaporating from them into a stream of gas their volatile constituents under regulated conditions of relative temperatures and pressures, such that the volatiles are removed at temperatures below their melting temperatures at atmospheric pressure and below the fusing temperature of the organic materials. The process consists, generally speaking, in treating such materials in three successive stages by passing gas into contact with the material. In the first stage the constitutents which would liquefy under atmospheric conditions at the temperature of treatment are removed. In the second stage there are removed normally permanent gases which are not condensable under atmospheric conditions. In the third stage the treated material is cooled. In each stage the volume of the gas and its temperature are independently and definitely regulated with reference to the amount of material treated and its temperature.

This method may be applied to either a continuous operation on a moving supply of material or to an intermittent operation on a stationary batch of material. In the intermittent operation the stages are successive in time. In the continuous operation the stages are successive both in time and in space with reference to the material.

To illustrate the invention, I will described the application thereof to a continuous operation, but it will be understood that the invention is not limited to the particular steps, combinations of steps or apparatus hereinafter disclosed, the same being for purposes of explanation, and is capable of modification in many respects.

In carrying out the process, organic material, such as high volatile bituminous coal, and a circulating stream of gas are fed contrawise through three processing stages or zones, normally with exclusion of air. These three stages or zones are for convenience and descriptiveness hereinafter termed the "evaporating zone", the "carbonizing zone" and the "cooling zone". The coal passes successively through the three stages or zones in the order named and the gas passes successively through the zones in the reverse order. The gas serves to convey heat to and from the coal to effect removal of volatiles and carbonization of the coal. In the evaporating zone the coal is moderately heated, not above its fusing temperature, by a large volume of gas and gives up condensable volatiles at a temperature below the normal melting temperatures of such volatiles. In the carbonizing zone the coal is heated by a lesser amount of gas sufficiently to effect carbonization and to give up non-condensable volatiles. In the cooling zone the carbonized product, hereinafter termed "char", is cooled by a still less volume of gas to a temperature at which it will not ignite in air and gives up heat to the gas.

It is a characteristic of this invention that the carbonized material or char produced is essentially different from that made by any other method of carbonization.

The differences in the volume of gas used in the several stages are obtained by feeding a part of the gas to the cooling zone, adding a second part of the gas to the first part as it enters the carbonizing zone and further adding a third part of the gas to the first two parts and the produced non-condensable gas as they enter the evaporating zone.

By proper regulation of the amounts and temperatures of the first and second parts of the gas a sufficient amount of heat is conveyed from the cooling zone, and from an outside source if necessary, to effect carbonization of the coal. By proper regulation of the amount and temperature of the third part of the gas the temperature of the whole volume of gas in the drying zone is maintained below the fusing temperature of the coal while at the same time the volatiles are both evaporated directly from the solid state to the vapor state and maintained in such vapor state due to lowering of their partial pressures by the relatively large volume of gas present. In this way sticking or caking of the coal is prevented.

Volatiles are separated from the gas by fractional condensation, the finally cooled gas being used as cooling agent in the first condensation so that a considerable portion of the heat of the gas may be conserved to reduce the amount of external heating to a minimum.

To facilitate comprehension of the invention, reference may be had to the accompanying diagrammatic illustration of one form of apparatus suitable for carrying out the process and which shows a carbonization retort or kiln 11 with an associated first stage condenser or heat exchanger 12, a second stage condenser 13, a stove 14, through which the treating gas is moved by an exhauster 15. The kiln consists of a gas-tight shell 16 lined with refractories 17. At the upper end of the kiln is a feeder 18 arranged to prevent the escape of gas when the material to be carbonized is introduced. At the lower end of the kiln is a stationary plate 19 which supports the material in the kiln. Carbonized material is withdrawn from the plate by plows 20, moved around the plate by a supporting gear ring 21. The removed material is collected in a car 22, which when filled is replaced by an empty car. The kiln is supported on legs 23.

The three zones in which the three stages of the process take place are formed in the kiln and are identified as the upper evaporating zone 24, in which the condensable volatile constitutents are removed; the intermediate carbonizing zone 25, in which non-condensable constituents are removed, and the cooling zone 26, in which the carbonized material is reduced to a temperature at which it can be removed and exposed to the air without igniting.

The gas which leaves the top of the kiln is removed through a pipe 27, which conducts it to the heat exchanger 12, in which the gas passes downwardly through the tubes 28 and is withdrawn from the exchanger through a pipe 29. The gas in passing through the exchanger is cooled and this causes part of the condensable volatiles to condense. These condensed volatiles run down the tubes and collect in a reservoir 30 at the bottom of the exchanger from which these condensed volatiles are removed through a pipe 31.

The hot top gas from the kiln leaves in the exchanger 12 not only the sensible heat represented by its change of temperature, but also the heat of vaporization of the volatiles which condense to liquid in the exchanger.

The gas from the exchanger 12 is carried through the pipe 29 to the condenser 13, in which the gas passes through the tubes 32 which are surrounded by water supplied cold through a pipe 33 and withdrawn when hot through a pipe 34. The further cooling of the gas in the condenser 13 causes substantially all the remaining condensable volatiles to condense out of the gas. This condensate runs down the tubes and collects in the reservoir 35 at the base of the condenser, from which the condensate is removed through a pipe 36.

From the condenser the gas passes through a pipe 37 to the exhauster, by which it is set forward under pressure through a pipe 38. From this pipe the gas divides into two portions. One portion passes through a valve 39 into a pipe 40, through which it is removed from the system. The other portion passes through a pipe 41 into the heat exchanger in the space surrounding the tubes. In the exchanger this portion of the gas absorbs the heat left by the hot top gas from the kiln and the condensed volatiles and, after becoming heated, leaves the exchanger 12 through a pipe 42.

The gas leaving the exchanger 12 through the pipe 42 is divided into three and possibly four portions. One portion passes through a valve 43 and a pipe 44, into the kiln at the junction of the evaporating zone and the carbonizing zone. Another portion may pass through a valve 45 and a pipe 46 into the stove 14, where it is heated between the tubes 47 of the stove and from which it passes through a pipe 48 into the kiln at the junction of the carbonizing zone and the cooling zone. A third portion may pass through a valve 49 and a pipe 50 into the stove 14, where it is burned with a supply of air coming in through a pipe 51. The products of this combustion pass through the tubes 47 of the stove and escape from the stove through a stack 52. The fourth portion passes through a valve 53 and a pipe 54 into the kiln at the bottom of the cooling zone.

In addition to these three separate supplies of gas to the kiln, a supply of air may be introduced at the junction of the carbonizing zone and the cooling zone through a pipe 55 from a blower 56. As it is desirable that the amount of gas and air maintain constant relative volumes, this air blower 56 is preferably driven by a mechanical connection (not shown) from the shaft of the exhauster.

It has been found possible with this kiln arrangement and with gas supplies of proper volumes and temperatures, to obtain carbonization results which cannot be duplicated in any other form of equipment. Especially, it is possible with this arrangement to obtain, from high volatile bituminous coal, city gas of high heat value, a large yield of coal oils and a free burning solid product which is not coke and which has the chemical and physical characteristics of anthracite coal.

The most serious difficulty that has heretofore prevented such a result has been the fact that such highly volatile coals when heated in a retort under atmospheric pressure, fuse before reaching the temperature of complete distillation. Such fusing coal is often designated as caking coal. The resulting stickiness or agglomeration prevents both the movement of the coal down in such a continuous apparatus as the kiln illustrated and also plugs up the interstices between the pieces of coal and prevents the heating of the coal by the passage of gas. This heating internally by gas has in itself important advantages of lowered cost of installation, lower cost of operation and better quality of products.

The average high volatile coal fuses at about 650° F. when heated in a closed retort under atmospheric pressure. It is therefore essential that the temperature of the gas in the evaporating zone should be below the fusing temperature of the coal. The actual fusing temperature of the coal depends on the volatiles contained in it.

The coal enters the top of the kiln at atmospheric temperature and is heated by the upcoming gases. This correspondingly cools the gas as it moves upward. Coal contains a long series of volatiles with gradually increasing boiling temperatures ranging from 50° F. to 800° F., and with a corresponding range of melting temperatures. As the coal moves down in the kiln the volatiles of lowest boiling and melting temperatures are removed first. Their removal raises the fusing temperature of the remaining coal. As the coal comes in contact with hotter and hotter gas, volatiles of higher boiling and melting points are removed. Each removal raises further the fusing temperature of the coal, until when all of the condensable volatiles are removed the fusing temperature of the remaining material is above any temperature that will be obtained in the kiln.

The low melting constituents of the coal, which it is necessary to remove to prevent the coal from fusing, are largely resinous derivatives of the original resins in the vegetable material from which the coal was formed.

At the same time that sticking due to fusion of the coal is prevented, sticking from a second and entirely different cause must also be prevented. Volatiles which have evaporated into the gas at higher temperatures, must not be allowed to condense in material amount on the incoming coal when the gas temperature is reduced during the upward movement of the gas. Any considerable amount of such condensation, especially of the higher boiling point volatiles, will stick the coal together quite as much as would fusion and would prevent both motion of the coal and passage of the gas.

The condensing temperatures of the coal oils depend on the relative volumes of the oil vapours and of the non-condensable gas in which the oil vapors are carried. The greater the volume of the non-condensing diluting gas, the lower the condensing temperatures. This is due to the reduced partial pressures of the oil vapors resulting from the larger proportion of non-condensable gas. According to this invention gas comes into the evaporating zone from the carbonizing zone below in certain volume and with a certain temperature. At the junction of the carbonizing zone and the evaporating zone, I add gas in such volume and at such temperature that the hot gas rising from the carbonizing zone will be cooled and the combined gases will pass through the evaporating zone below the normal fusing temperature of the coal, while for the temperature at which the gas leaves the top of the charge, the gas will be in sufficient volume to prevent the coal oils from condensing at such temperature.

The coal moving down through the evaporating zone is heated by the upcoming gas; and the total heat necessary to do this and to provide for the heat loss by radiation from the kiln shell in this zone, and for the heats of vaporization of the oils vaporized has to be taken from the gas. The total amount of gas in this zone therefore must be sufficient to start at the bottom of the zone at a temperature below the fusing temperature of the coal at that point and still remain hot enough at the top to carry the oil vapors after having given up the amounts of heat mentioned.

The circulating gas in the evaporating zone therefore functions in four ways, namely: first, reduces the partial pressure of the condensable volatiles to enable low temperature vaporization; second, prevents appreciable condensation of the volatiles; third, supplies vaporization heat to the volatiles; and fourth, supplies the heat absorbed by the coal and lost by radiation. It has been found that, using average high volatile bituminous coal, and with a top leaving temperature of about 300° F. for the gas, the volume of gas necessary to perform these four functions is about 60 cubic feet per pound of coal fed. This is about ten times the volume of the gas distilled from a pound of the coal under ordinary retort conditions and is a larger volume than that of the products of the incomplete combustion of the same coal. The sensible heat carried into the kiln by this volume of gas at the necessary temperature is less than three per cent of the heat of the complete combustion of the same coal. It is therefore evident that the conditions attending the operation of this process are quite different from those of the prior art processes.

As the coal or partly carbonized material goes into the carbonizing zone with no further risk of fusing or of having vaporous volatiles condensed to liquid upon it, the large volume of gas used in the evaporating zone is therefore not required in the carbonizing zone. By adding as much as possible of this gas at the top of the carbonizing zone, it can be put in at a lower pressure than if it had to force its way also through the charge in the carbonizing zone.

Gas comes to the bottom of the carbonizing zone from two sources. One source is the hot gas coming up from the cooling zone. The other source is the hot gas from the stove. As heating gas in the stove burns valuable gas for fuel, it is desirable to use as little stove gas as possible. The essential thing is to leave the temperature of the mixed gas entering the bottom of the carbonizing zone sufficiently high to drive out as much of the non-condensable volatiles from the coal as is desired. Some are usually left in to make the carbonized residue mechanically strong and easily ignited in subsequent use.

The hot carbonized material or char contains a definite amount of heat as it enters the cooling zone determined by the temperature required for carbonization. The less the amount of cooling gas is, the hotter the gas will be heated by the amount of heat available in the char. At the same time the less the char will be cooled. It is essential that the char is discharged from the kiln below its temperature of ignition in air. For char from high volatile coal, this ignition temperature is about 650° F. The hotter the cooling gas is delivered at the bottom of the cooling zone, the hotter it will be at the top of the cooling zone, and the less high temperature stove gas will have to be mixed with it.

It might be thought that more heat could be recovered from the cooling gas, if the char is cooled to a lower temperature by means of cooler cooling gas, such as could be taken direct from the exhauster. This is true, but it has been found that the extra heat recovered in this way is less than the cooling gas can take up from the top gases, if the cooling gas is put through the exchanger. The top gases leave the kiln at a temperature of 300° F. carrying about 500 B. t. u. of recoverable heat per pound of coal charged. The highest economical temperature for the return gas entering the bottom of the kiln is within 10° F. of this or 290° F., corresponding to a heat capacity or 290° B. t. u. per pound of gas. Consequently, as this amount per pound cannot be much increased regardless of the investment in exchanger, the only available method of taking more heat from the top gas is to put all the return gas available through the exchanger. In commercial operation about 300 B. t. u. per pound of coal can be recovered from the top gas.

The more heat recovered from the top gas by the return gas in the exchanges, the smaller the condenser can be, as less heat remains to be removed by the condenser. The higher the temperature of the cooling gas the smaller the stove can be, as less heat has to be put into the cooling gas by the stove to bring it up to the temperature of the carbonizing zone.

If the total amount of the gas leaving the top of the kiln were brought up to the temperature of the carbonizing zone by putting all the gas in below the carbonizing zone, the gas leaving the carbonizing zone would contain more heat than the coal entering the kiln at the top could absorb, and the gas would therefore go through the evaporating zone and out at the top at so high a temperature that the coal would fuse.

In the carbonizing zone the break-up of constituents of the coal, accompanied by a rearrangement of the chemical combination of the oxygen in the coal, releases a considerable amount of heat. With most coals this released exothermic heat exceeds the radiation loss and the heat absorbed by the coal in the carbonizing zone, so that the gas arrives at the top of the carbonizing zone carrying more heat than when it enters the bottom of the carbonizing zone.

With the average high volatile, high oxygen bituminous coal, the exothermic heat developed in this way may amount to 300 B. t. u. per pound of coal.

As the coal passing through the carbonizing zone is heated by the ascending circulating gas, additional gas distills from the coal. This amounts to about 4 cubic feet per pound of coal and is of high heat value, usually in excess of the heat value required for a commercial distillation as city gas. It is profitable to dilute this gas to increase the volume and reduce the heat value to the basis required.

This can be conveniently done by introducing air at the bottom of the carbonizing zone. As the carbon of the carbonized material is in excess, it burns in this air in preference to the hydrogen of the gases. The amount of air that is usually required in this way is small, being about ½ of one cubic foot per pound of coal.

The result of the combustion with this air is producer gas, a mixture of carbon monoxide and nitrogen. This producer gas could be made outside the kiln and mixed with the high heat value gas outside of the kiln system. By making the producer gas directly in the kiln, the heat which is released in the production of this producer gas is recovered and to an equal amount reduces the amount of heat to be supplied by the stove and therefore the amount of gas burned in the stove. For the production of city gas of 537 B. t. u. per cubic foot, this producer heat will amount to some 80 B. t. u. per pound of coal. This heat is added to the gas in the carbonizing zone along with the exothermic heat. Together they provide nearly enough heat to make up for the heat not recovered in the heat exchanger and, for the loss by radiation, so that the heat supplied by the stove need only be a small part of the total heat utilized in the kiln operation. This correspondingly reduces the investment in the stove and the costs of its operation.

The amount of gas that can be removed from the circulating gas system through the pipe 40 without altering the volume of gas in circulation is equal to the sum of the gas distilled from the coal and the gas produced from the supplied air, less the amount of gas burned in the stove.

As the carbonized material usually has a commercial value per pound of half that of the circulating gas and a combustion heat value about the same per pound, it would be an advantage to burn some of the carbonized material to heat the stove in place of burning the gas.

Therefore, for efficient operation the following conditions are essential:—

1. The gas temperature in the evaporating zone should be below the fusing temperature of the coal in that zone.

2. The gas volume in the evaporating zone should be sufficient to keep the coal oils from condensing at the temperature of the gas in the evaporating zone.

3. The minimum practical amount of gas should be used in the cooling zone, at as high an available temperature as will enable delivery of the cooled carbonized material safely below its ignition temperature when exposed to the atmosphere.

4. The temperature of gas in the carbonizing zone should be the minimum practical to produce carbonized material containing the amount of volatile contents desired.

Due to the presence of such large amounts of circulating gas the temperatures required throughout the kiln are much lower for the same distillation result than are required in other kilns. This is due to the lower vaporizing temperatures caused by the low partial pressures of the vapors resulting from the presence of the large volume of the circulating gas. In general in this kiln the corresponding temperatures Fahrenheit are less than half those needed in most kilns. Whereas 800° F. is required for the substantially complete vaporization of the oils from coal in the usual types of city gas plants, in this kiln an equally complete vaporization can be made with a temperature of 300° F.

Four important results come from this low temperature operation:—

1. As the kiln temperatures are lower the radiation losses are less and the cost of operation correspondingly reduced.

2. As the coal has to be heated to a lower temperature, the heat to be absorbed by the coal is less and the operation therefore more rapid with corresponding reduction in both the investment and operating costs.

3. As the coal oils are vaporized at a low temperature, they escape the cracking effects of high temperature and are therefore greater in amount and of more value per pound.

4. As the coal is distilled without fusing, a new type of fuel is obtained. The spongy form of coke is due to its having fused and being blown up in bubbles by entrapped gas. When coal is distilled in this kiln without fusion, no bubbles are formed. Instead, under a magnifying glass, the carbonized product of this process is seen to be full of fine parallel fissures. These represent the junctions of the original laminations of the vegetable material from which the coal was formed. The weight of the char is approximately 70% of the weight of the coal from which it is produced. The great surface exposed to combustion by these fissures per pound of carbonized material makes the solid product of this process extremely free burning, while the removal of most of the volatiles eliminates the production of smoke in its combustion. This free burning characteristic makes this carbonized material of especial value for use in water gas equipment as a means for largely increasing capacity of existing installations.

It will be understood that the cooled gas on its way from the condenser to the exhauster may be subjected to any usual scrubbing operations to remove the low boiling point volatile coal oils which do not condense out in the condenser and also to remove ammonia.

It has been pointed out that any heat deficiency in the process may be made up in various ways, i. e., by heating gas in a stove fired with gas or char produced in the process or by a partial combustion of the solid products with air in the kiln or by heat from some external source. In the case of the stove, the hot combustion products thereof may be turned into the gas stream entering the bottom of the hot zone with much the same diluting effect as when char is burned with air in the kiln. The same result may be obtained by introducing hot reducing gas from some external source, for example, hot producer or blast furnace gas.

The relative lengths of the processing zones through which the carbonaceous material passes are determined largely by the volumes and temperatures of the different portions of the circulating gas supplies, and by varying either of these, within limits, the character and amounts of the products may be varied; for example, the yield of gas when a low B. t. u. gas is permissible may be greatly increased at a sacrifice of the char by burning char with air in the kiln. On the other hand, if there is no sale for gas in the locality of any plant, the process may be operated to produce a very high grade of char and very little gas beyond that necessary for continued operation. All that is necessary is to regulate the temperature of the circulating gas to keep a lower temperature in the kiln, say not over 600° F. and for some coals, under 500° F. The evaporating step is carried out as already described but, because of the lower maximum temperature, the fixed gas in the coal is not split off to any extent and the char produced is correspondingly heavier and of higher heat value. Under such conditions, there is no appreciable liberation of exothermic heat and some gas must be made to supply the heat required by the kiln. The amount of gas required for this purpose is under two cubic feet per pound of coal.

Many other variations are possible in both the process and the apparatus for carrying out the same. For example, when city gas of lower heat value than herein dealt with is to be made, a larger amount of air may be admitted to the bottom of the carbonizing zone and the increased amount of combustion heat resulting will enable elimination of the stove with consequent reduction in installation and operation costs. It must therefore be understood that the invention is not confined to the precise steps, combinations of steps, volumes, temperatures and the like herein set forth, especially as these will vary more or less according to the material treated and the products desired, but embodies all such modifications as fall within the scope of the appended claims.

Having thus described my invention, what I claim is:—

1. A method of obtaining hydrocarbons from solid carbonizable material which will yield hydrocarbons on distillation, which method comprises treating the material in successive stages of preheating, distilling and quenching the material treated with a circulation of heated permanent non-oxidizing gas being substantially entirely a distillation product previously derived from the material, the amount of circulating gas passed in contact with the material decreasing from the preheating stage to the quenching stage and the temperature of the gas in contact with material in the distilling stage being sufficiently high to effect distillation of the material.

2. A method of obtaining hydrocarbons from solid carbonizable material which will yield hydrocarbons on distillation, which method comprises passing non-oxidizing gas being substantially entirely a distillation product previously derived from the material heated above atmospheric temperature in contact with said material in successive stages of preheating, distilling and cooling of residue, the volume of said gas in the first stage being larger than the volume of said gas in the following stages and the temperature of the gas in the initial and final stages being less than the temperature of the gas in the intermediate stage, which temperature is sufficiently high to effect distillation of the material.

3. A method of obtaining hydrocarbons from solid carbonizable material which will yield hydrocarbons on distillation, which method comprises circulating heated non-oxidizing gas in contact with the material, in successive stages of preheating, distilling and cooling of residue, the amount of circulating gas per unit of material being less in each successive stage and the temperature of the gas in the second stage being sufficiently high to cause distillation and higher than in the first and last stages, and adding air, in amount sufficient for combustion of only a minor part of the material, to the gas as it contacts with material under treatment in the second stage whereby a part of the material is burned with the air to supply additional heat necessary for distillation of material which does not liberate sufficient on distillation.

4. A method of distilling solid carbonizable material which comprises circulating a stream of heated non-oxidizing gas in contact with the material, removing the gas, cooling the gas in a heat exchanger, condensing the vaporous products of the distillation from said gas by further cooling the gas, removing a part of the gas from the circulation, reheating the remainder of the gas in said heat exchanger by means of an uncooled portion of the gas stream, passing a portion of the reheated gas in contact with the solid residue of distillation thereby to cool the residue below its ignition temperature in air, further heating another portion of said gas and passing said first portion after contact with the residue and the second portion at a temperature to cause distillation in contact with material for distillation thereof and cooling the gas emerging from the distilling operation by adding thereto the remainder of the reheated gas and passing the whole of the gas in contact with untreated material.

5. A method of distilling solid carbonizable material, which comprises passing heated non-oxidizing gas being substantially entirely a distillation product previously derived from the material in contact with the material in successive stages for preheating, distillation and cooling of residue, the weight of the gas (apart from gas and vapours produced by the distillation in progress) passing per unit of material being greater in the stage in which the material is initially treated than in the subsequent stages and the temperature of the gas being lower in said stage of initial treatment than in a following stage of subsequent treatment.

6. A process of distilling solid carbonizable material which comprises passing in contact with partially distilled material a stream of non-oxidizing gas being substantially entirely a distillation product previously derived from the material suitably heated partly out of contact with the material and its residue to a temperature sufficient to cause distillation, and then passing said stream of gas with the gaseous products of distillation and a relatively large volume of cooler similar non-oxidizing gas into contact with less completely distilled and undistilled material.

7. A process of distilling solid carbonizable material which comprises heating a stream of the material progressively as it advances through a distillation zone thereby to effect successive stages of distillation, the heating being effected by means of an oppositely flowing stream of suitably heated non-oxidizing gas being substantially entirely a distillation product previously derived from the material admitted at points in the length of the distillation zone in regulated amounts such that the volume of admitted gas flowing per unit of time is greatest in the initial stage of the distillation and progressively less in the succeeding stages of the distillation.

8. In a process of distilling solid carbonizable material, progressively cooling one portion of the length of a stream of hot gaseous and vaporous products of distillation in a plurality of stages to separate condensable constituents, employing the cooled gas from the final cooling stage to cool another portion of the length of said stream of hot gas in the primary cooling stage thereby reheating the cooled gas, further heating a portion of the reheated gas by passing one part of said portion in contact with hot solid distillation residue and a second part of said portion through external heating apparatus, passing said further heated portion of gas at temperature suitable for distillation in contact with the material in the final stages of distillation to heat the same to the distillation temperature of volatiles of lower condensing temperature not previously removed, and then passing said further heated gas together with the remainder of the reheated gas in contact with the material in the earlier stages of distillation.

9. In a process of distilling solid carbonizable material, circulating a substantially constant amount of hot gas accumulated from previous distillation oppositely to the movement of a stream of the material, progressively cooling such gas and the vaporous and gaseous products of distillation in a plurality of stages to separate condensable constituents, removing gas from the system at a rate substantially equal to the rate of production of permanent gas from the distillation, employing the remaining cooled gas from the final cooling stage to partially cool hot gas and vapors emerging from the distillation, thereby to condense the vapors and to reheat the cooled gas, further heating a portion of the reheated gas by passing one part of the portion in contact with hot solid products of distillation and a second part of the portion through external heating apparatus, passing such further heated portion of gas at temperature suitable for distillation in contact with the material in the later stages of distillation to heat the same to distillation temperature and then passing such further heated gas together with the remainder of the reheated gas in contact with the material in the earlier stages of distillation.

10. A process of making a combustible carbonized product from high volatile bituminous coal, which comprises heating the coal by contact with hot non-oxidizing gas being substantially entirely a distillation product previously derived from the material in such amount and at such temperature that the condensable volatiles of the coal evaporate into and remain vaporous in the gas, further heating the solid residue of said evaporation step in presence of a lesser volume of said gas at such higher temperature that non-condensable volatiles evaporate into the gas, the temperatures in both stages being below the fusing temperature of solid residue under treatment, and finally cooling the resulting solid residue with exclusion of air to a temperature below its ignition temperature in air.

11. In a process of distilling solid carbonizable material, heating a stream of the material to distilling temperature, progressively along its length by contact with a stream of suitably heated non-oxidizing gas circulating through the material, and by-passing a portion of the gas to avoid its passage in contact with the material when the same is most highly heated.

12. In a process of distilling solid carbonizable material, heating a stream of the material to distilling temperature progressively along its length by contact with a stream of suitably heated non-oxidizing gas circulating through the material, by-passing a portion of the gas to avoid its passage in contact with the material when the same is most highly heated, the volume and temperature of gas present in any stage of the process being sufficient to effect removal of volatile constituents of the solid material at temperatures below the fusing temperature of the material in that stage.

13. A process of distilling coal which comprises passing in contact with partially distilled coal a stream of non-oxidizing gas heated partly by contact with the hot solid distillation residue and partly out of contact with the coal and its residue, and then passing the stream of gas together with the gaseous and vaporous products of distillation and an additional relatively large volume of cooler gas into contact with less completely distilled and undistilled coal.

14. A method of distilling coal which comprises heating the coal by circulating hot non-oxidizing gas in contact with said coal, removing the gas, cooling the gas in a heat exchanger, subsequently further cooling said gas and condensing therefrom the liquid products of the distillation, removing a part of the gas, reheating the remainder of the gas in said heat exchanger, dividing the reheated gas into portions, using one re-heated portion to reduce the temperature of the solid product of the distillation below the ignition temperature of said solid product when in contact with the atmosphere, adding a second reheated portion of the gas to the first reheated portion after use of the same as cooling agent for the solid product, and then passing the mingled first and second portions of the reheated gas into contact with further coal.

15. A process of distilling in successive stages solid carbonizable material containing volatile hydrocarbons, which comprises passing non-oxidizing gas in contact with the hot solid residue of distillation, passing the gas thus heated at temperature suitable for distillation in contact with material in later stages of distillation, and cooling the gas by intermingling therewith an additional volume of cool non-oxidizing gas and passing the whole amount of gas in contact with material in the early stages of distillation.

16. A process of distilling in successive stages solid carbonizable material containing volatile hydrocarbons, which comprises heating non-oxidizing gas by passing the same in contact with the hot solid residue of distillation, further heating the gas by addition of hot non-oxidizing gas thereto and passing both amounts of gas at temperature suitable for distillation through material in the later stages of distillation, and then cooling the gas by addition of cool non-oxidizing gas thereto and passing the cooled gas through the material in the early stages of distillation.

17. A process of distilling in successive stages solid carbonizable material containing volatile hydrocarbons, which comprises heating non-oxidizing gas by passing the same in contact with hot solid products of distillation, further heating the gas and utilizing the heated gas at temperature suitable for distillation to heat material in the later stages of distillation, cooling the gas by addition of cool non-oxidizing gas thereto and utilizing the cooled gas to heat material in the early stages of distillation.

18. A process of distilling in successive stages solid carbonizable material containing volatile hydrocarbons, which comprises heating non-oxidizing gas by passing the same in contact with the material during the later stages of distillation, cooling the gas by addition of cool non-oxidizing gas and passing the cooled gas at temperature suitable for distillation of the lower boiling volatiles of the material through material in the initial stage of distillation to heat the same and remove the vaporous distillation products therefrom.

19. A process of distilling solid carbonizable material which comprises moving a stream of the material through successive zones of relatively lower and higher temperature adequate for the removal of the volatiles from said material progressively according to their boiling points, passing non-oxidizing gas being substantially entirely a distillation product previously derived from the material through the hot solid residue of the distillation and thence through the material undergoing distillation contrawise to the movement thereof, the said gas serving to cool the residue below its ignition temperature in air and the gas being thereby heated, adding to said gas prior to its contact with the material in said zone of higher temperature an amount of non-oxidizing gas heated to such higher temperature than the gas leaving the residue that the combined amounts of gas will maintain the temperature in said zone of higher temperature and heat the material therein for distillation of the higher boiling volatiles, adding to said gases after passage through said zone of higher temperature and before entry into said zone of lower temperature an amount of cooler gas whereby the temperature of the gas flowing in said zone of lower temperature is reduced below the temperature necessary for removal of higher boiling volatiles from the material in the zone of lower temperature but is maintained at temperature sufficient to heat the material in the zone of lower temperature for removal of volatiles of lower boiling temperature, and removing the mingled three amounts of gas and the gaseous and vaporous products of distillation through material entering the zone of lower temperature.

20. A process of distilling solid carbonizable material which comprises moving a stream of the material through successive zones of relatively lower and higher temperature adequate for the removal of the volatiles from said material progressively according to their boiling points, passing non-oxidizing gas through the hot solid residue of the distillation and thence through the material undergoing distillation contrawise to the movement thereof, the said gas serving to cool the residue below its ignition temperature in air and the gas being thereby heated, adding to said gas prior to its contact with the material in said zone of higher temperature an amount of non-oxidizing gas heated to such higher temperature than the gas leaving the residue that the combined amounts of gas will maintain the temperature in said zone of higher temperature and heat the material therein for distillation of the higher boiling volatiles, adding to said gases after passage through said zone of higher temperature and before entry into said zone of lower temperature an amount of cooler gas whereby the temperature of the gas flowing in said zone of lower temperature is reduced below the temperature necessary for removal of higher boiling volatiles from the material in the zone of lower temperature but is maintained at temperature sufficient to heat the material in the zone of lower temperature for removal of volatiles of lower boiling temperature, and removing the mingled three amounts of gas and the gaseous and vaporous products of distillation through material entering the zone of lower temperature, cooling the removed gas and vapors in successive stages of progressively lower temperature thereby to condense out volatiles removed from the material, the gas after passage through the cooling stage of lowest temperature and after removal of a portion thereof substantially equal to the permanent gas produced from the material being used as cooling agent for the gas passing through the primary cooling stage of highest temperature, whereby the cooled gas is reheated, dividing the reheated gas into three portions and passing the three portions of the gas through further materials as aforesaid with heating of the second portion externally of the distillation.

21. A process according to claim 19, in which the volume of gas passed in contact with the material is in each distillation zone proportional to the amount of volatiles removable from the material in that zone in suchwise that the volatile constituents of the material will evaporate into the gas at temperatures below the boiling temperatures of the volatiles under ordinary atmospheric conditions.

22. A process according to claim 19, in which the volume of gas passed in contact with the material is so proportioned to the amount of volatiles removable from the material that the volatile constituents will evaporate into the gas while the gas is at a temperature below the temperature at which permanent gas is released from said material.

23. A process according to claim 19, in which the temperature of the gas flowing in the zone of lower temperature is below the boiling temperature of the lowest boiling volatiles removed from the material in the zone of higher temperature and the volume of the gas is so proportioned to the amount of volatiles removable from the material that the said volatiles will not condense on the material in the zone of lower temperature.

In witness whereof I have hereunto set my hand.

FREDERICK T. SNYDER.